United States Patent [19]

Bertling et al.

[11] Patent Number: 4,818,039
[45] Date of Patent: Apr. 4, 1989

[54] AUTOMATIC DRIVE SLIP REGULATING UNIT

[75] Inventors: Hannes Bertling, Vaihingen; Heinz Siegel, Stuttgart, both of Fed. Rep. of Germany

[73] Assignee: Robert Bosch GmbH, Stuttgart, Fed. Rep. of Germany

[21] Appl. No.: 104,192

[22] Filed: Oct. 5, 1987

[30] Foreign Application Priority Data

Oct. 3, 1986 [DE] Fed. Rep. of Germany ....... 3633687

[51] Int. Cl.$^4$ .............................................. B60T 8/32
[52] U.S. Cl. ..................................... 303/113; 180/197; 180/244; 303/13; 303/14; 303/116; 303/119; 303/110; 303/10; 303/68; 188/358; 188/345
[58] Field of Search ................................ 303/113–119, 303/111, 92, 100, 110, 10–12, 13, 7, 14–18, 13, 93, 52, 68; 60/567, , 545, 547.1, 557, 562, 566; 188/106, 355–359, 349, 345; 180/197, 244–250, 233

[56] References Cited

U.S. PATENT DOCUMENTS

| | | | |
|---|---|---|---|
| 3,232,676 | 2/1966 | Cripe | 303/119 |
| 3,503,655 | 3/1970 | Heimler | 303/114 |
| 3,771,838 | 11/1973 | Rossigno et al. | 303/7 |
| 3,871,716 | 3/1975 | Skoyles | 303/113 |
| 3,887,238 | 6/1975 | Bennett | 303/7 |
| 4,071,283 | 1/1978 | Van House | 303/114 |
| 4,166,654 | 9/1979 | Snodgrass | 303/14 |
| 4,421,359 | 12/1983 | Hayashi et al. | 188/345 X |
| 4,456,310 | 6/1984 | Hayashi et al. | 188/345 X |
| 4,465,322 | 8/1984 | Hayashi | 303/116 X |
| 4,561,701 | 12/1985 | Fujii et al. | 303/119 |
| 4,575,161 | 3/1986 | Vanzant et al. | 303/116 X |
| 4,673,221 | 6/1987 | Hayashi et al. | 303/115 X |
| 4,681,373 | 7/1987 | Nomura et al. | 303/119 X |
| 4,681,374 | 7/1987 | Nakamura et al. | 303/10 G |

FOREIGN PATENT DOCUMENTS 3127301 1/1983 Fed. Rep. of Germany .
2109882 6/1983 United Kingdom .

Primary Examiner—Douglas C. Butler
Attorney, Agent, or Firm—Edwin E. Greigg

[57] ABSTRACT

An automatic drive slip regulating unit for motor vehicles or the like which communicates via a connecting line with at least one brake line between a master brake cylinder and an anti-skid system with wheel brakes connected downstream. The connecting line is intended to discharge into a cylindrical chamber of an additional master cylinder, and the cylindrical chamber is intended to be variable by a plunger that is subject to the pressure of a spring-supported spring reservoir plunger. To return this spring reservoir plunger to its terminal position, for instance in the event of leakage or upon termination of the drive slip regulation, the spring reservoir plunger is to be subjectable on its other side to a pressure medium which derives from a separate low-pressure hydraulic circuit.

18 Claims, 6 Drawing Sheets

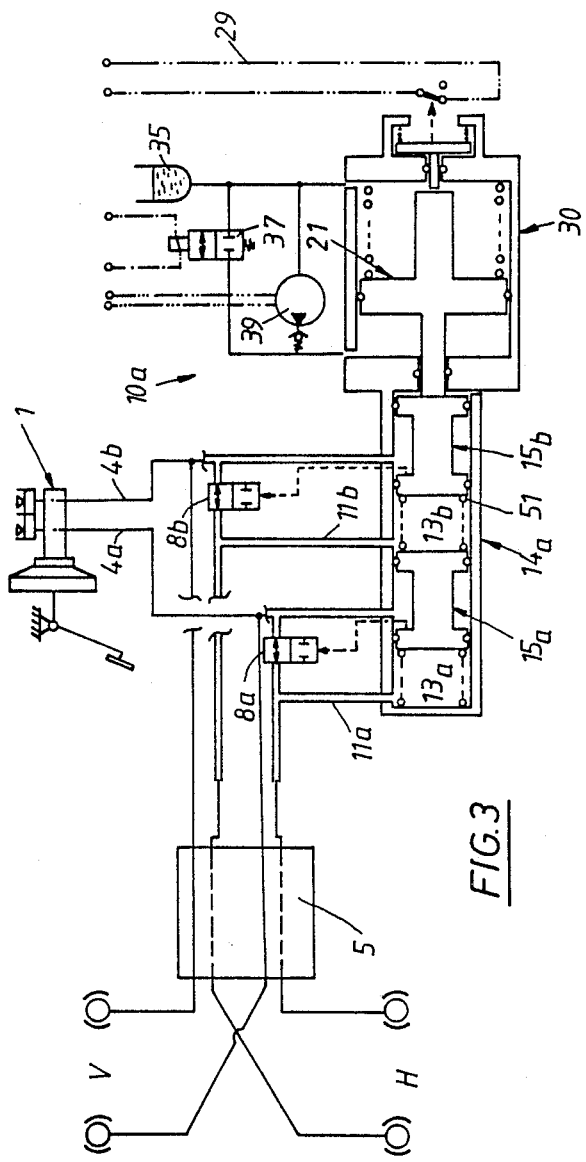
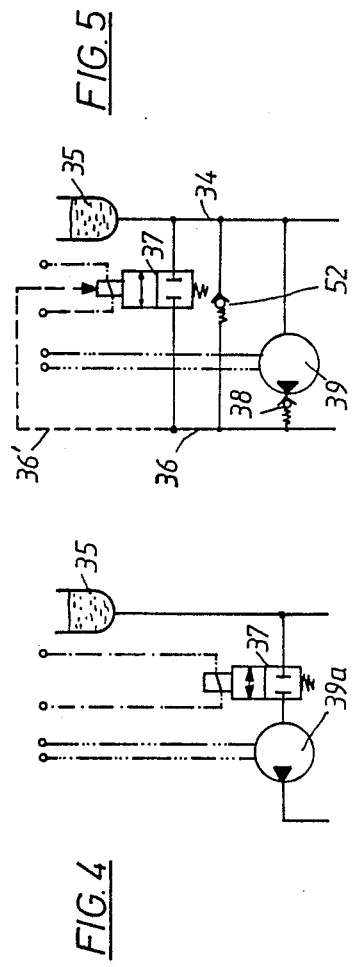
FIG.3
FIG.4
FIG.5

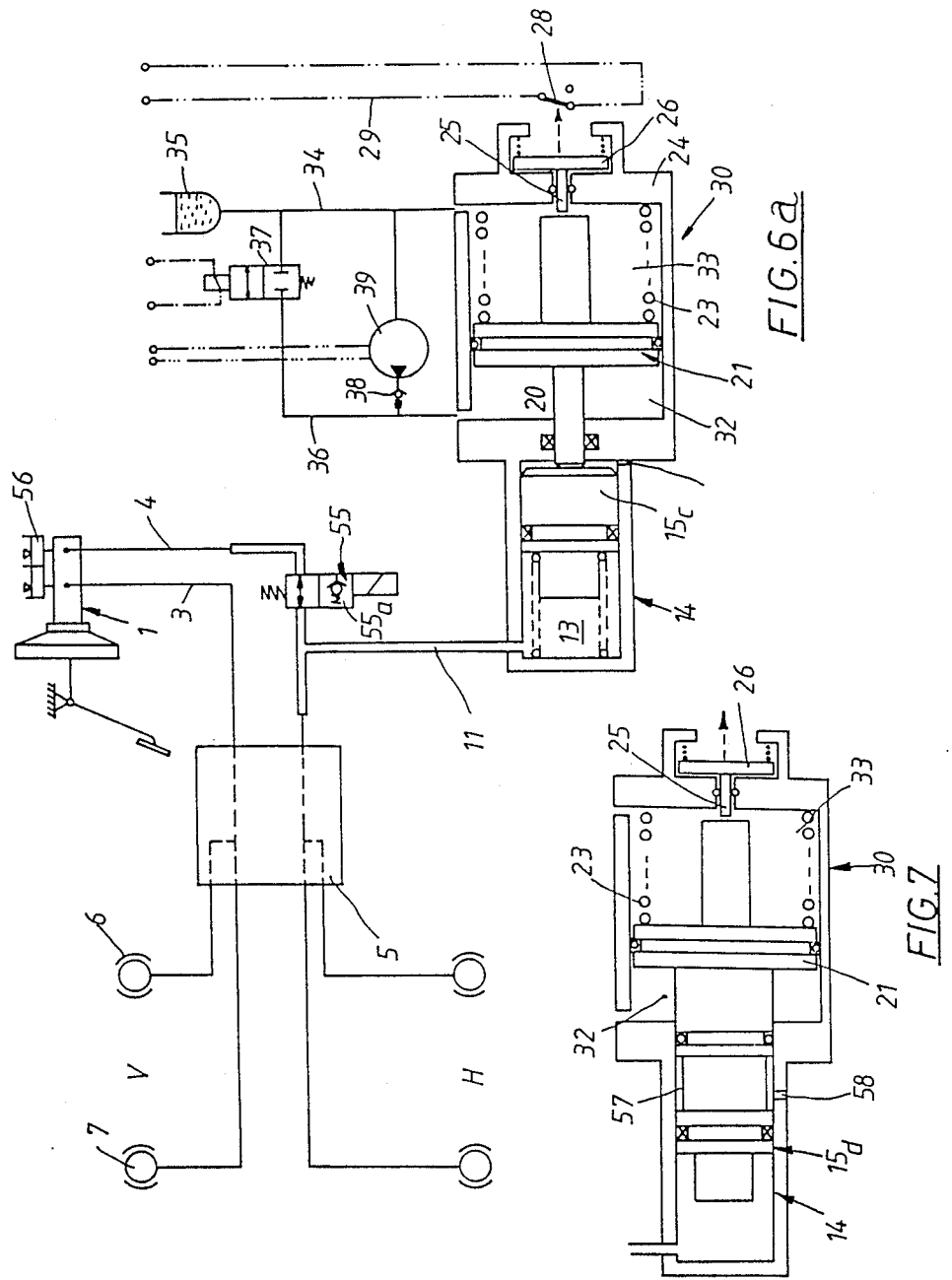

AUTOMATIC DRIVE SLIP REGULATING UNIT

BACKGROUND OF THE INVENTION

The invention is based on an automatic drive slip regulating unit for motor vehicles or the like as defined hereinafter. Drive slip regulating units, or propulsion regulating devices, are used for slowing spinning drive wheels back down again by actuating their wheel brakes. This spinning is detected for instance by wheel rpm sensors, which are already used in the known antiskid system. An automatic drive slip regulating unit of this kind is known for instance from German Pat. No. 31 27 301. There, a pressure intensifier that includes a floatingly supported plunger set into motion by an auxiliary pressure source is incorporated into a brake line between the master brake cylinder and the anti-skid system. This propulsion regulating device has the disadvantage, first, that it is integrated directly into the brake line and accordingly affects the normal braking process. Furthermore, when a plurality of brake circuits are present, one such propulsion regulating device must be provided for each individual brake circuit. Leaks or improper restoration of the plunger are not detected and so can cause considerable disruptions in the normal braking process.

OBJECT AND SUMMARY OF THE INVENTION

The automatic drive slip regulating unit according to the invention for motor vehicles or the like, has the advantage over the prior art, first, that the actual automatic drive slip regulating unit is completely separate from the actual brake system of the motor vehicle because the only connection present is that via the attachment line. In the normal braking operation, the drive slip regulating unit is switched off completely, while conversely during a slip regulating operation the master brake cylinder is shut off. Yet the master brake cylinder can readily be switched on by being actuated, so that normal braking operation is not disturbed in any way.

On the other hand, both the master brake cylinder and the drive slip regulating unit use the anti-skid system in common, which makes this embodiment of the invention very economical.

Because the drive slip regulating unit according to the invention needs to be incorporated between the anti-skid system and the master brake system only via a connecting line, its installation in existing systems is made easier. The same applies to installation in diagonally distributed brake circuits, in which case two plungers having variable cylinder chambers associated with them are disposed in the additional master cylinder.

The advantages of a spring-supported spring reservoir plunger are self-evident. In contrast to the auxiliary pressure source according to the aforementioned prior art, a helical spring needs no maintenance, is subjected to little wear and remains unchanged in its operation over a long period, quite aside from not having leakage problems.

According to the invention the central element of the present drive slip regulating unit is divided up into the additional master cylinder and a spring reservoir. However, it should be of no consequence how the transitions or connections are embodied. The plunger may either engage the spring reservoir plunger with a control rod or ay equally well be integrally formed onto it. The essential factor is that the spring reservoir plunger divides the spring reservoir into two cylinder chambers, the helical spring being disposed in the cylinder chamber remote from the additional master cylinder. When the drive slip regulating unit is put into operation, this helical spring builds up the necessary brake pressure. It must therefore have the force required to do so.

When the drive slip regulating unit is shut off, contrarily, the spring reservoir plunger should return to its terminal position. According to the invention this return is effected by a separate low-pressure hydraulic circuit, which communicates with the other cylinder chamber. This low-pressure hydraulic circuit is used not only to reinforce the return of the plunger to its terminal position, however, but also is put into action whenever the spring reservoir piston escapes from its terminal position, for instance because of leakage, without an actual signal for starting up the drive slip regulating unit having been received. Thus even if leakage occurs, no lasting braking can occur via the drive slip regulating unit, which would cause considerable wear of the wheel brake apparatus.

Incorporated into the low-pressure hydraulic circuit is a low-pressure pump, which pumps a pressure medium from a fluid reservoir into the cylinder chamber. As a result, the spring reservoir plunger is guided into its terminal position, counter to the force of the helical spring acting upon it.

A magnetic valve is also intended to be provided in a bypass around this low-pressure pump, this valve being switched for an open passage through it whenever the drive slip regulating unit is put into action. As a result, the pressure medium flows out of the cylinder chamber via the bypass line and the magnetic valve, back into the fluid reservoir, and the helical spring can therefore relax. This movement of the spring reservoir plunger acted upon by the helical spring is also followed up by the plunger in the additional master cylinder, and as a result the brake pressure necessary for suppressing the slip is built up in this plunger's cylinder chamber, the connecting line, the anti-skid system, and the following brake system.

Furthermore, a check valve is disposed parallel to the bypass line having the magnetic valve. This has the advantage in the final phase of the drive slip regulation that a low pumping capacity on the part of the low-pressure pump, as compared with the pumping capacity of the return pump provided in the anti-skid system, does not lead to a negative pressure in the cylinder chamber in the event that this chamber cannot fill quickly enough.

If a gear wheel pump, for example, is used as the low-pressure pump, then a check valve preceding this pump is unnecessary, and the magnetic valve can be connected in series after it.

For starting up the low-pressure hydraulic circuit, the terminal position of the spring reservoir plunger must be detected. For the sake of simplicity, it is useful to provide a switch that is actuated by a bolt or switch element that is connected to the spring plunger. In this connection, however, the invention is not intended to be limited to the exemplary embodiment shown, but may include other detector devices available on the market instead.

The present invention is also particularly advantageous when used in diagonally divided brake circuits. To this end, all that needs to be done is to disposed two plungers in the additional master cylinder, which maintain a specific axial spacing from one another and each communicate with their respective brake circuit via a connecting line. The plungers are then moved in common by a spring reservoir plunger, and one plunger can for example brace itself relative to the other via a helical spring or the like in order to form the variable cylindrical chamber that is required. As desired, the present unit can accordingly be provided for one or more brake circuits; all that is needed is to change the additional master cylinder.

To separate the actual brake system and the drive slip regulating unit, a central valve should be incorporated in the brake line following the master brake cylinder, but before the connecting line, this central valve being triggerable by its plunger assigned to it in the additional master cylinder. If a normal braking operation is performed, then the central valve is opened. Contrarily, if the drive slip regulating unit is needed, then a signal to close the central valve is effected by the plunger. However, it has proved to be disadvantageous here that this central valve is also closed whenever leaks occur, for instance, in the spring reservoir and the spring reservoir plunger leaves its terminal position. In that case, the central valve also closes, and although pressure medium from the master brake cylinder reaches the anti-skid system or the wheel brake cylinder in a braking operation, nevertheless not all this fluid can be returned any longer. It is therefore provided that this central valve be replaced with a magnetic valve, which closes the brake line only upon a signal from wheel rpm sensors, for example, or in other words a genuine signal that is intended to start up the drive slip regulating unit.

Novel features of the method of the present invention reside on the one hand in the spring action of the plunger that generates the brake pressure, and on the other in the detection of its terminal position. As a result, substantial advantages are attained in terms of the functional capability of the entire drive slip regulating unit. Other special features are the disposition of the low-pressure hydraulic circuit and its mode of operation, by which means the plunger can be guided in a very simple manner.

Another particularly noteworthy advantage of the invention is the improved separation between the actual brake system and the drive slip regulating unit attained by means of a central or magnetic valve.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is a block circuit diagram of a further exemplary embodiment of an automatic drive slip regulating means combined with an anti-skid system;

FIG. 4 is a block circuit diagram of part of the regulating circuit for the automatic drive slip regulating means of FIG. 3, in a different embodiment;

FIG. 5 is a block circuit diagram of part of the regulating circuit for the automatic drive slip regulating means of FIG. 3, in another embodiment;

FIG. 6a is a block circuit diagram of another embodiment of an automatic drive slip regulating means combined with the anti-skid system;

FIG. 7 is a highly schematic view of a further exemplary embodiment of an element according to FIG. 2.

DESCRIPTION OF THE PREFERRED EMBODIMENTS

Figure 1:
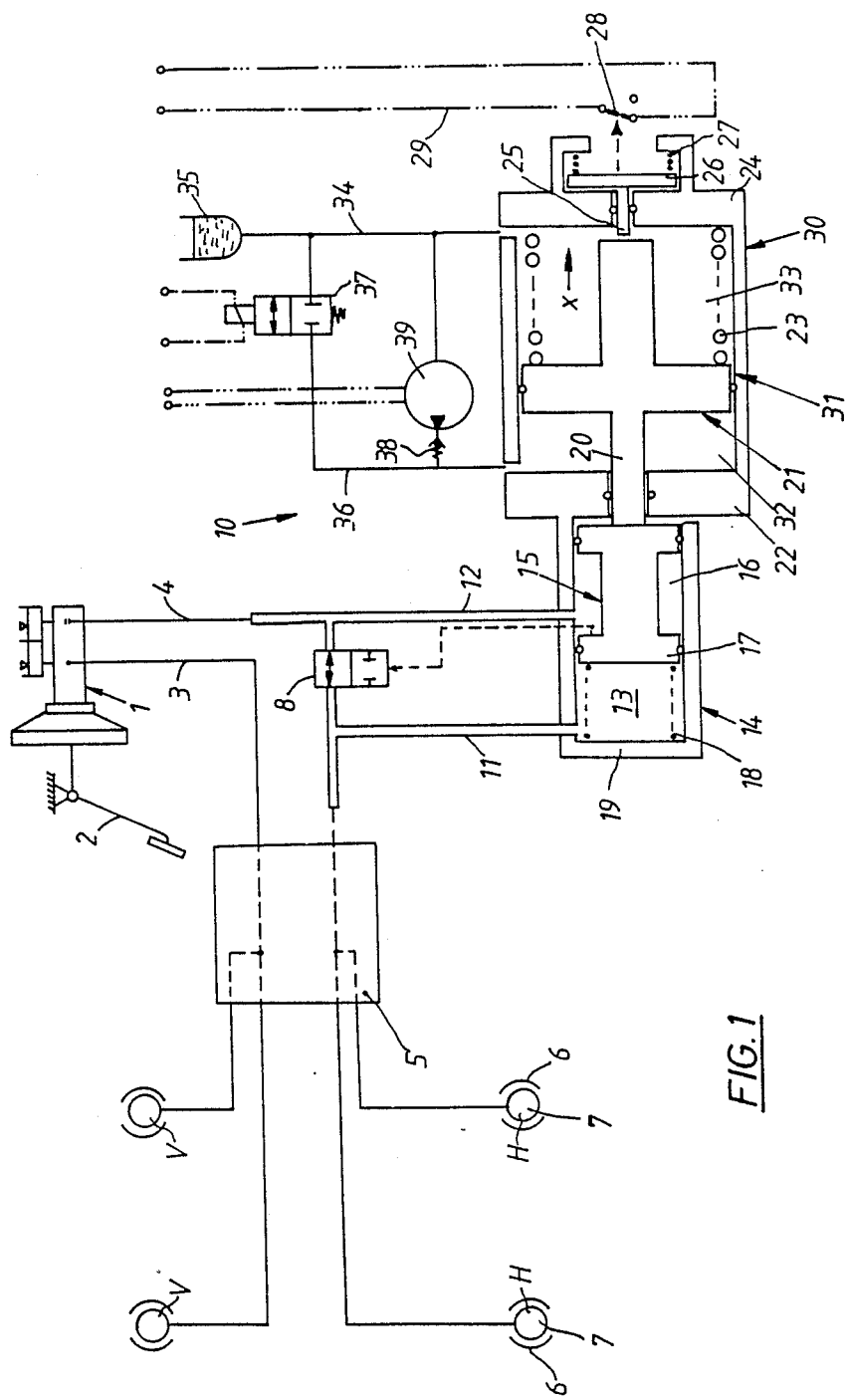
FIG. 1 is a block circuit diagram of an automatic drive slip regulation means (ASR) combined in accordance with the invention with an anti-skid system (ABS)

As seen in FIG. 1, a master brake cylinder 1 having a schematically represented brake pedal 2 communicates via brake lines 3 and 4 with a four-channel anti-skid system 5. Via this anti-skid system 5, the pressure of brakes 6, shown only schematically, of wheels 7 of a passenger vehicle, for example, is regulated. The front wheels V are associated with the brake line 3, and the rear wheels H are associated with the brake line 4.

Incorporated into the brake line 4 between the master brake cylinder 1 and the anti-skid system 5 is a central valve 8, and in the position of use shown in FIG. 1 the central valve 8 has opened the brake line 4 between the master brake cylinder 1 and the anti-skid system 5. By means of a switchover of this central valve 8, an automatic drive slip regulating means 10 according to the invention is incorporated into the brake line 4. This regulating means can also be called a propulsion regulating apparatus.

For communication with the brake line 4, connecting lines 11 and 12 are provided on both sides of the central valve 8, which discharge axially offset into a cylinder chamber 13 of an additional master cylinder 14. Supported in this addition master cylinder 14 is a plunger 15, which comprises two plunger disks 17 connected with one another, thereby forming an annular chamber 16. This plunger 15 is braced on one side via a helical spring 18 against a cylindrical bottom 19 and on the other end, toward the face end, meets a control rod 20 of a spring reservoir plunger 21, and the additional master cylinder 14 is connected to a cylinder housing 22 which is adapted to receive this spring reservoir plunger 21.

The spring reservoir plunger 21 is braced in turn via a helical spring 23 against a cylinder head 24 of the cylinder housing 22, and there, upon a propulsion in the direction x it contacts a pin element 25 that passes through the cylinder head 24. This pin element 25 is connected to a switching element 26, which can likewise be guided in the direction x counter to the force of a further helical spring 27. In so doing, the switching element 26 actuates a switch 28 and interrupts a signal line 29.

Figure 2:
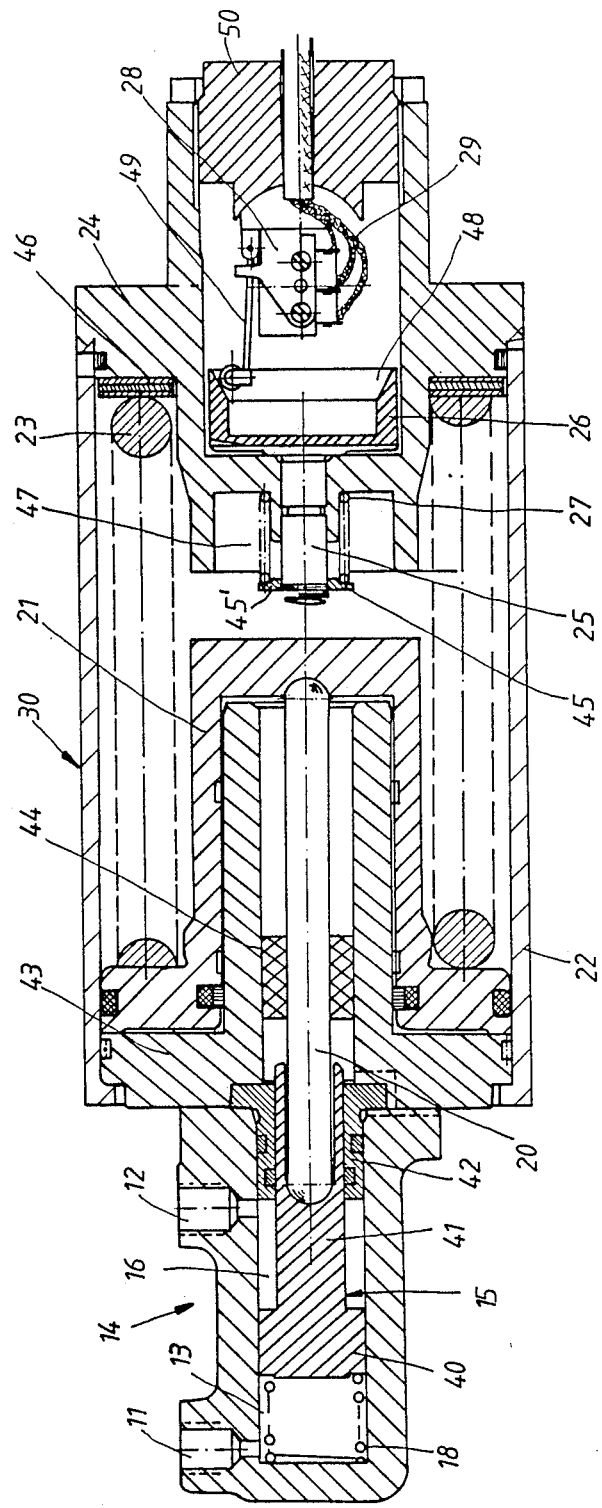
FIG. 2 is a longitudinal section taken through an element of the automatic drive slip regulation means of FIG. 1, seen on a larger scale.

An exemplary embodiment of the additional cylinder 14 and of the spring reservoir 30 communicating with it is described in FIG. 2.

The spring reservoir plunger 21 divides a cylindrical chamber 31, formed in the cylinder housing 22, into two chambers 32 and 33. The cylindrical chamber 33 communicates via a line 34 with a fluid reservoir 35. Branching off from this line 34 upstream of the fluid reservoir 35 is a line 36 leading to the cylinderical chamber 32, into which a 2/2-way magnetic valve 37 is incorporated. Between them, the line 36 also communicates upstream of the cylindrical chamber 32 with the line 34, via a check valve 38 and a low-pressure pump 39. The spring reservoir 30, the low-pressure pump 39, the check valve 38, the magnetic valve 37 and the fluid reservoir 35 together form a separate low-pressure hydraulic circuit. The low-pressure pump 39 is triggered by an electronic/electrical system, not shown in detail.

The mode of operation of the automatic drive slip regulating means according to the invention is as follows:

When drive slip regulation is not taking place, the spring reservoir plunger 21 is in its terminal position, in which it has actuated the switch 28 via the pin element 25 and the switching element 26. As a result, the signal line 29 is turned off. If that should not be the case, however, then via the electronic/electrical system, not shown, the low-pressure pump 39 is started up, which pumps a medium out of the fluid reservoir 35 into the cylindrical chamber 32 until such time as the spring reservoir plunger 21 reaches its terminal position, counter to the force of the helical spring 23, or until a long-term recognition means that is part of the electronic system finds or detects a fault situation.

However, if one or both driven wheels 7 is spinning, then the wheel rpm sensor or the like, for example (not shown) reports to the electronic system, which starts up the automatic drive slip regulating means 10. To this end, a switching signal is emitted to the magnetic valve 37, which opens the bypass around the pump 39. Now the medium located in the cylindrical chamber 32 can flow back into the fluid reservoir 35 via the line 36. As a consequence, the force of the helical spring 23 comes fully into play and displaces the spring reservoir plunger 21 contrary to the direction x. The control rod 20 thereupon meets the plunger 15 in the additional master cylinder 14. The latter, as shown by dashed lines in FIG. 1, triggers the central valve 8 and closes off the communication between the master brake cylinder 1 and the anti-skid system 5. In the cylinder chamber 13, the connecting line 11, the anti-skid system 5 and in the rest of the brake system, a brake pressure can thus build up unhindered. The additional master cylinder here acts as a brake cylinder, and the anti-skid system 5 influences the automatic drive slip regulation in the same way as during normal braking.

Toward the end of the drive slip regulation, whenever the spinning wheels have been slowed down by braking, the hydraulic medium fed into the corresponding brake 6 is pumped back, by a return feed pump in the anti-skid system 5, into the cylinder chamber 13 of the additional master cylinder 14 via the connecting line 11. As a result, the plunger 15 exerts a pressure via the control rod 20 upon the spring reservoir plunger 21 such that the spring 23 is nearly fully pre-stressed again. Before the drive slip regulation shuts off completely, that is, before the switch 28 is actuated, a shutoff of the magnetic valve 37 is effected first. From this moment on, the low-pressure pump 39 can act once again and takes on the task of filling the cylindrical chamber 32, so that the additional master cylinder 14 is relieved.

FIG. 2 shows the construction of the spring reservoir 30 with the additional master cylinder 14 flanged to it, with a few slight modifications. The connecting line 11 leads into the cylinder chamber 13, in which the helical spring 18 is braced against the plunger 15. In this exemplary embodiment, the plunger 15 comprises not two connected plunger disks 17 but rather an actual pressure plunger 40, which with a plunger rod 41 passes through a sleeve-like annular flange 42 and with it defines the annular chamber 16.

The control rod 20 is inserted into the plunger rod 41 and on the other end is arranged to engage the spring reservoir plunger 21. This plunger 21 surrounds an insert 43 of the cylinder housing 22. The control rod 20 is braced in this insert 43 by means of elastic guides 44.

The relatively sturdy embodiment of the helical spring 23, which is disposed between an annular collar of the spring reservoir plunger 21 and the cylinder head 24, is clearly apparent.

Located toward the face end opposite the spring reservoir plunger 21 is the pin element 25, on which a ring 45 is retained by means of a snap ring 45'. The helical spring 27 is disposed between this ring 45 and an annular groove 47 surrounding the bolt.

Slipped onto the other end of the ring 45 is the shell-like switching element 26, which has a peripheral incline or chamfered portion 48, along which a roller-equipped lever 49 of the switch 28 can easily roll. From the switch 28, the corresponding signal lines 29 extend to the outside through a closure plug 50.

In FIG. 3, an expansion of the automatic drive slip regulating means 10a to the operation of diagonally divided brake circuits 4a and 4b is illustrated. The additional master cylinder 14a is embodied as a so-called tandem master cylinder and is occupied by two plungers 15a and 15b. The second plunger 15b is braced via a further helical spring 51 against the other plunger 15a and with it forms an additional cylinder chamber 13b. During the operation of the drive slip regulating means 10a, the two central valves 8a and 8b remain closed. In order nevertheless to be able to actuate the brake pedal normally at any time, the front wheels are uncoupled from the rear wheels in the exemplary embodiments of FIGS. 3 and 8 in such a way that during drive slip regulation and simultaneous braking, the wheels not affected by the drive slip regulation can be braked immediately, since they communicate with the brake circuits 4a and 4b upstream of the central valves 8a and 8b. In this way, an expansion to the operation of diagonally divided brake circuits can be made, using identical basic components and a correspondingly modified anti-skid system as well as the same drive slip regulating logic.

Typically the magnetic valve 37 in both the exemplary embodiment of FIG. 1 and that of FIG. 3 is disposed in the bypass. With special low-pressure pumps, such as a gear wheel pump 39a shown for example in FIG. 4, it is also possible to dispose the magnetic valve 37 in series between the pump 39a and the fluid reservoir 35. In that case, the pump motor should not be acted upon electrically during the operation of the drive slip regulation 10a.

In FIG. 5, an additional check valve 52 disposed in the bypass is also shown, which in the final phase of the drive slip regulation has the advantage that a slight feed capacity of the low-pressure pump 39 as compared with the feed capacity of the return feed pump in the anti-skid system will not lead to a negative pressure in the cylindrical chamber 32 if this chamber is not filling up fast enough. This check valve 52 acts as a re-aspiration valve and prevents the negative pressure and could for example be embodied with a very simple structure in the form of a sleeve in the seal of the spring reservoir plunger 21.

In order to protect the low-pressure circuit from overpressure, for example due to thermal stresses, the magnetic valve 37 can additionally be used as a pressure limiting valve. To this end, it is connected toward the rear with the line 36 via 36'. The compression spring of the magnetic valve 37 must be adapted to suit the desired limitation pressure.

Figure 6B:
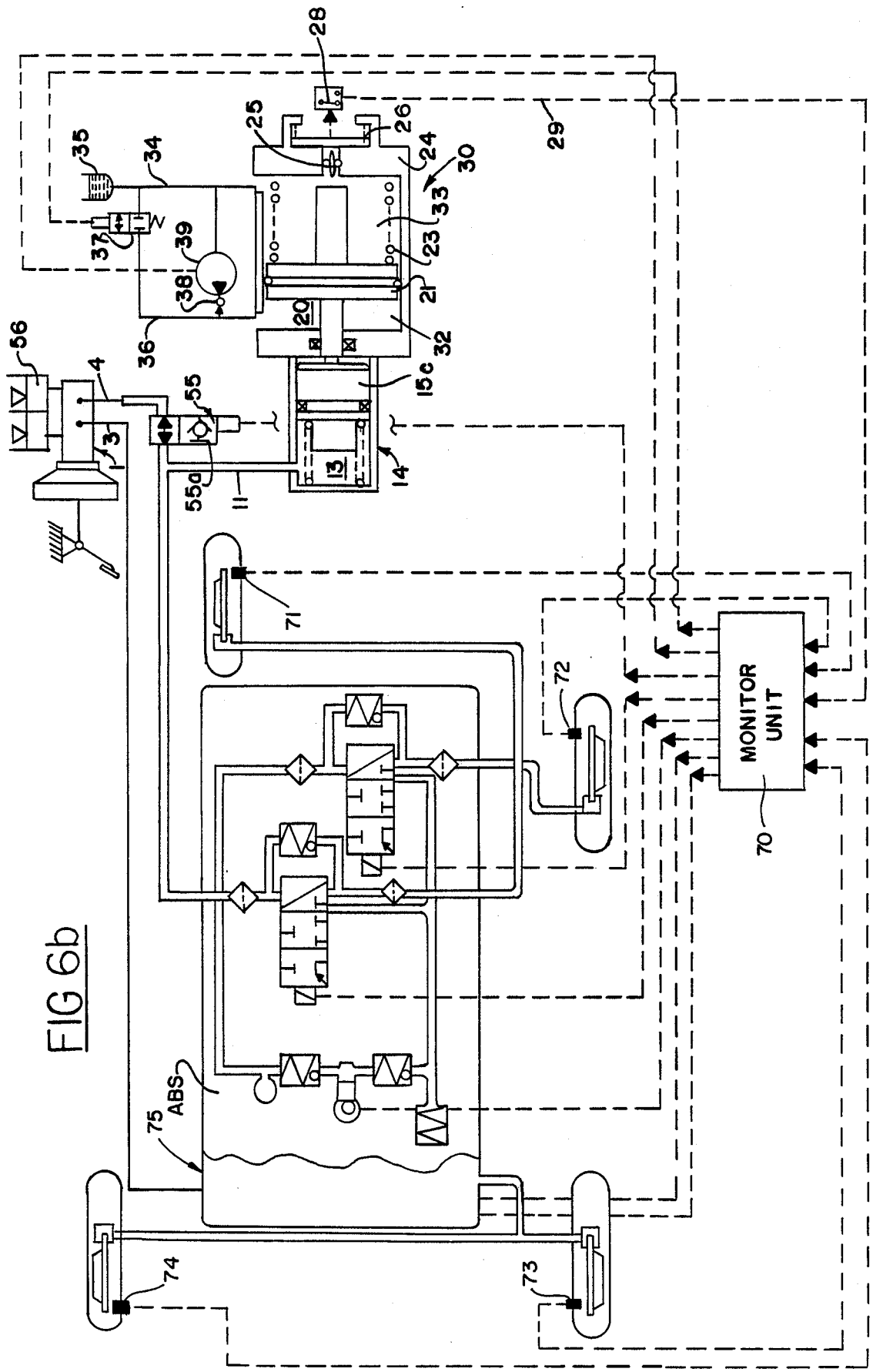
FIG. 6b depicts a schematic layout of the anti-skid system with a monitor unit.

According to FIG. 6a, instead of the central valve 8 of the preceding figures, a magnetic valve 55 is incorporated into the brake line 4 between the master brake cylinder 1 and the anti-skid system 5. The connecting line 12 from the brake line 4 to the additional master cylinder 14 is also omitted here. As a result, the plunger 15c of the additional master cylinder 14 can be embodied more simply, since it need not trigger the magnetic valve 55. The triggering of the magnetic valve 55 is taken over by the electronic system. In normal braking, the magnetic valve 55 is in the position shown in FIGS. 6a and 6b, while during operation of the drive slip regulation the check valve 55a is put into action.

This embodiment has particular advantages if leaks arise in the low-pressure circuit, for example in the spring reservoir 30. In the exemplary embodiments of FIGS. 1-3, the spring reservoir plunger 21 could no longer be retained in its terminal position then, and the central valve 8 would close. During a braking operation, then, pressure medium from the master brake cylinder 1 can still reach the brakes 6, but no longer can all of it be returned, so that a residual pressure remains in the brake 6 or in the wheel brake cylinder.

In the exemplary embodiment of FIGS. 6a and 6b, if leaks now arise in the spring reservoir 30, then although the spring reservoir plunger 21 moves to the left under the force of the helical spring 23 and acts upon the plunger 15c of the additional master cylinder, this still does not bring about any braking operation, because the magnetic valve 55 remains open and the brake fluid can reach a brake fluid container 56 via the connecting line 11, the magnetic valve 55, and the brake line 4. The brake itself can moreover be actuated normally.

Only if the necessity of a drive slip regulation is indicated does the magnetic valve 55 close as well, and interrupt the brake line 4 in one direction.

FIG. 6b illustrates the overall system including the automatic drive slip regulating system as set forth above and shown in FIG. 6a. The motor 38, the control valve 37 and the control valve 55 all receive signals from the monitor unit 70 which, in turn, receives signals from the switch 28 and the wheel sensors 71-74. The monitor unit also controls signals that are directed to the ABS system 75 shown in FIG. 6b. The monitor unit and ABS system are known in the art and are not a part of this invention.

FIG. 7 shows a simplified embodiment of the spring reservoir 30, to which the additional master cylinder 14 is connected. The plunger 15d here is connected directly to the spring reservoir plunger 21, and on its circumference the plunger 15d has an annular chamber 57, which can be relieved by means of a bore 58.

Figure 8:
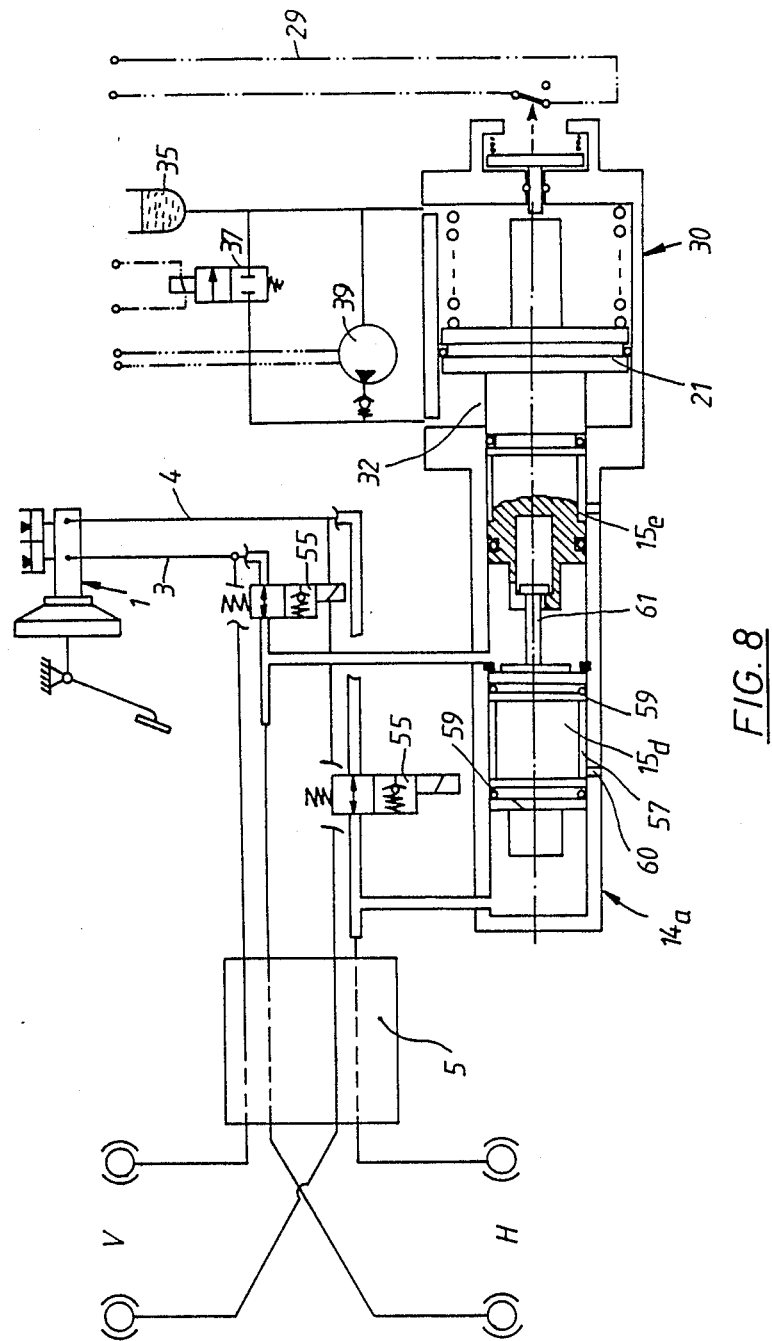
FIG. 8 is a block circuit diagram of a further exemplary embodiment of an automatic drive slip regulating means combined with the anti-skid system.

FIG. 8, finally, shows an automatic drive slip regulating means which is designed for the operation of diagonally divided brake circuits as in FIG. 3; here again, the front wheels can correspondingly be uncoupled from the rear wheels. However, instead of the central valves, magnetic valves 55 are disposed in the brake circuits. Also, two plungers 15d and 15e are disposed in the additional master cylinder 14a. The plunger 15d has two seals 59 and an annular chamber 57 relieved by a bore 60. The second plunger 15e also has a somewhat similar form, but it is connected to the plunger 15d via a slide rod 61.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An automatic drive slip regulating system for motor vehicles or the like, which comprises a first master brake cylinder for applying pressure via brake lines to brake cylinders of the wheels of a vehicle, an anti-skid system which controls brake fluid to said wheel cylinders to prevent a skid, a magnetic control valve in at least one brake line for controlling brake fluid flow from said first master cylinder to said brake cylinders, an automatic drive slip regulating unit, a connecting line (11) connected with said at least one brake line between said magnetic control valve and said anti-skid system, and with a second master brake cylinder, said connecting line (11) discharges into a cylinder chamber (13) of said second master cylinder (14) which includes a plunger (15) therein, said cylinder chamber (13) is adapted to be varied in volume by means of said plunger (15), which is subject to a pressure of a spring-supported reservoir plunger (21) in a cylindrical housing (22).

2. A unit as defined by claim 1, in which said spring reservoir plunger (21) divides a spring loaded reservoir (30) into first and second chambers (32, 33), said second chamber (33) which is remote from said second master brake cylinder (14) being provided with a spring means (23) which is pre-stress able upon a movement of said spring reservoir plunger (21) in a direction (x), and said first chamber (32) being incorporated into a separate low-pressure hydraulic circuit.

3. A unit as defined by claim 2, in which said first chamber (32) communicates with a fluid reservoir (35) via both a low-pressure pump (39) having a check valve (38) downstream thereof and via a magnetic valve (37) incorporated in a bypass line (36).

4. A unit as defined by claim 3, in which a further check valve (52) is disposed in said bypass line (36) parallel to the magnetic valve (37) and to the low-pressure pump (39).

5. A unit as defined by claim 2, in which said first chamber (32) communicates via a low-pressure pump, such as a gear wheel pump (33a), and a magnetic valve (37) connected in series downstream thereof.

6. A unit as defined by claim 2, in which said spring supported reservoir plunger (21) in a first position is adapted to actuate a switch (28) for shutting off a signal line (29) for the low-pressure hydraulic circuit.

7. A unit as defined by claim 6, in which said spring supported reservoir plunger (21) is adapted to actuate a pin element (25), which in turn actuates said switch (28).

8. A unit as defined by claim 1, in which said plunger (15) is associated with said spring supported reservoir plunger (21) via a control rod (20).

9. A unit as defined by claim 1, in which said plunger (15) is formed integrally with said spring reservoir plunger (21).

10. A unit as defined by claim 1, in which said plunger (15) is subject to the pressure of a helical spring (18).

11. A unit as defined by claim 1, further including diagonally divided brake circuits having two brake lines, and said second master brake cylinder, a connecting line (11a, 11b) branching off from each brake line (3, 4) and associated with said second master brake cylinder (14a), said additional master cylinder including two plungers (15a and 15b or 15d and 15e) which are disposed axially in line with one another and each of said two plungers embodies a variable cylindrical chamber (13a, 13b) adapted to communicate with said respective connecting line (11a, 11b).

12. A unit as defined by claim 11, in which a spring means is interposed between said plungers (15a and 15b or 15d and 15e).

13. A unit as defined by claim 1, in which a central valve (8), is triggerable by said plunger (15) for closing said brake line.

14. A unit as defined by claim 1, in which said at least one magnetic valve (55) effects the closure of a brake line by means of a check valve (55a).

15. A method for actuating the brakes of a motor vehicle or the like by means which comprises incorporating an anti-skid system into at least one brake line disposed between a set of wheel brakes and a master brake cylinder, connecting a line which branches off from said brake line between said master brake cylinder and an automatic drive slip regulating means, actuating a brake pedal to apply pressure in said anti-skid system and said brakes in communication therewith, and detecting a terminal position of a spring loaded plunger in a second master brake cylinder.

16. A method as defined by claim 1 which comprises guiding said spring loaded plunger into its terminal position by a pressure medium from a low-pressure hydraulic circuit counter to said spring loaded plunger.

17. A method as defined by claim 1, which comprises movement of said spring loaded plunger at an onset of a drive slip regulation, and interrupting a brake line between said master brake cylinder and said anti-skid system by means of a central valve.

18. A method as defined by claim 1, which comprises interrupting said brake line between the master brake cylinder and said anti-skid system electronically by a magnetic valve at an onset of a drive slip regulation.

* * * * *